United States Patent
Mallikarjuna Durga Lokanath et al.

(10) Patent No.: US 11,764,978 B2
(45) Date of Patent: Sep. 19, 2023

(54) METHOD AND SYSTEM FOR CERTIFICATE MANAGEMENT

(71) Applicant: Salesforce, Inc., San Francisco, CA (US)

(72) Inventors: Savithru Mallikarjuna Durga Lokanath, San Jose, CA (US); Vaishnavi Vithal Galgali, San Jose, CA (US); Arpeet Kale, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 14 days.

(21) Appl. No.: 17/160,335

(22) Filed: Jan. 27, 2021

(65) Prior Publication Data
US 2022/0239503 A1   Jul. 28, 2022

(51) Int. Cl.
*H04L 9/32*      (2006.01)
*H04L 9/08*      (2006.01)

(52) U.S. Cl.
CPC ............ *H04L 9/3268* (2013.01); *H04L 9/083* (2013.01); *H04L 9/0891* (2013.01); *H04L 9/0894* (2013.01); *H04L 9/3265* (2013.01)

(58) Field of Classification Search
CPC ..... G06F 21/62; G06F 21/6218; H04L 63/08; H04L 63/0823; H04L 63/10; H04L 63/101; H04L 9/08; H04L 9/0894; H04L 9/083; H04L 9/3268
See application file for complete search history.

(56) References Cited

U.S. PATENT DOCUMENTS

| | | | |
|---|---|---|---|
| 7,730,478 B2 | 6/2010 | Weissman | |
| 10,382,201 B1* | 8/2019 | Allo | G06F 21/575 |
| 11,444,785 B2* | 9/2022 | Vaddi | H04L 9/321 |
| 11,445,021 B2 | 9/2022 | Mallikarjuna Durga Lokanath et al. | |
| 2011/0239004 A1* | 9/2011 | Hayashi | H04L 9/3263 713/189 |
| 2017/0338968 A1* | 11/2017 | Feng | H04W 12/04 |
| 2018/0145971 A1* | 5/2018 | Mistry | H04L 63/0823 |
| 2019/0349357 A1* | 11/2019 | Shukla | H04L 63/20 |
| 2021/0241241 A1 | 8/2021 | Lokanath | |
| 2021/0377054 A1* | 12/2021 | Mahajan | G06F 9/455 |
| 2022/0263655 A1* | 8/2022 | Murray | H04L 63/0823 |

OTHER PUBLICATIONS

"AWS Certificate Manager," Amazon Web Services, Inc., User Guide, Version 1.0, Aug. 17, 2020, 127 pages.
"AWS Secrets Manager," Amazon Web Services, Inc., API Reference, API Version Oct. 17, 2017, 117 pages.

(Continued)

*Primary Examiner* — Shaqueal D Wade-Wright
(74) *Attorney, Agent, or Firm* — Nicholson, De Vos, Webster & Elliott, LLP (57) ABSTRACT

A method and system for certificate management for services in a container orchestrator. The method includes requesting a certificate for a service from a cloud certificate manager, in response to detecting a request from a control plane of the container orchestrator for the certificate for the service, receiving the certificate from the cloud certificate manager, storing the certificate in a secret storage, and returning the location of the secret storage to a requester of the certificate.

24 Claims, 5 Drawing Sheets

(56) References Cited

OTHER PUBLICATIONS

"Controllers," Kubernetes Documentation, The Kubernetes Authors, CC BY 4.0, The Linux Foundation, downloaded from https://kubernetes.io/docs/concepts/architecture/controller/#:~:text=In%20Kubernetes%2C%20controllers%20are%20control,closer%20to%20the%20desired%20state on Jan. 25, 2021, last modified Jan. 20, 2021, 3 pages.

"Custom Resources," Kubernetes Documentation, The Kubernetes Authors, CC BY 4.0, The Linux Foundation, downloaded from https://kubernetes.io/docs/concepts/extend-kubernetes/api-extension/custom-resources/ on Jan. 25, 2021, last modified Oct. 13, 2020, 7 pages.

\* cited by examiner

METHOD AND SYSTEM FOR CERTIFICATE MANAGEMENT

TECHNICAL FIELD

One or more implementations relate to the field of certificate management; and more specifically, to a component of a container orchestration system to manage certificates for services in conjunction with a cloud computing environment.

BACKGROUND ART

In computing and networking, cryptography is used to protect information and secure it from unwanted access. When computer programs communicate with one another locally or over a network, the messages between the computer programs can be encrypted to protect the information being exchanged. To facilitate such secure communications, security certificates such as public key certificates are utilized.

Public key certificates are also known as digital certificates or identity certificates. Public key certificates are data structures used to verify the ownership of a public key. The public key certificate includes information about the public key, information about the identity of the owner (referred to as the 'subject') of the public key, and a digital signature of the issuer of the public key certificate. The issuer of the public key certificate is an entity that has verified the public key certificate's contents. A computer program can validate the digital signature of the issuer by contacting the issuer to establish trust in the public key certificate. Once the public key certificate is trusted, then it can be used to communicate securely with the subject of the public key certificate using the associated public key. In many use cases a subject of the public key certificate is a person or organization. However, in other use cases such as use in transport layer security (US) a subject of the public key certificate can be a specific computing device or program executed by the computing device.

Public key certificates and similar types of security certificates can have different formats and include different types of data. In one example, a public key infrastructure (PKI) scheme, the certificate issuer is a certificate authority (CA), that is a company that charges customers to issue certificates for them. The most common format for public key certificates is defined by the X.509 standard by the International Telecommunication Union.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for managing public key certificates in a container orchestration system. In particular, the methods and apparatus provide a certificate orchestrator that monitors for requests for public key certificates, herein referred to as certificates, and in response, obtains the certificates from the associated cloud computing environment, stores the related data in a secret storage provided by the cloud computing environment, and provides the location of the certificate and related information to the requestor. The certificate orchestrator can facilitate the operation of services that are managed by the container orchestration system, by enabling the provision and configuration of certificates for the services and related functions.

In this manner, the certificate orchestrator enables all services in the container orchestrations system to use public and private certificates to encrypt the communication amongst the services, as well as microservices. The certificates are generated by an underlying cloud certificate manager (e.g., an amazon web services (AWS) certificate manager ACM where the cloud computing environment is AWS). The certificates are stored in a secret storage provided and managed by the cloud computing environment (e.g., AWS Secrets Manager in the AWS environment). The secret storage can be organized as a set of keystores and truststores where private keys and the corresponding public keys of trusted services are stored, respectively.

Without the availability of a certificate orchestrator, the creation of certificates is manual and due to the permission model of the container orchestration system, the certificates can only be provisioned/de-provisioned for services therein by an infrastructure engineer or similar administrator of the container orchestration system.

Certificate management by the certificate orchestrator includes provisioning certificates, monitoring the expiration of the certificates, which typically have a fixed duration, and renewal of the certificates. The cloud certificate manager (e.g., AWS ACM) provides functions for generating and renewing certificates, but does not interface with services supported in the container orchestration system, and thus cannot be utilized directly by services for certificate creation or renewal.

The services run on the container orchestration system (e.g., in an elastic container service for Kubernetes (EKS) in AWS). Thus, the services have a scope that is limited to operation within the set of resources within the container orchestration system. Hence, the certificate management features provided by the cloud certificate manager cannot be accessed by these services. In order to support certificate provisioning and management and provide a self-serve model for carrying out such activities, the certificate orchestrator is utilized, which is a specialized controller in the container orchestration system (e.g., a custom Kubernetes controller where the container orchestration system is Kubernetes). The certificate orchestrator provides functions related to managing and accessing certificates, keystores and truststores by services in the container orchestration system including functions for checking certificate expiry, alerts on expiration of certificates, and similar functions.

Figure 1:
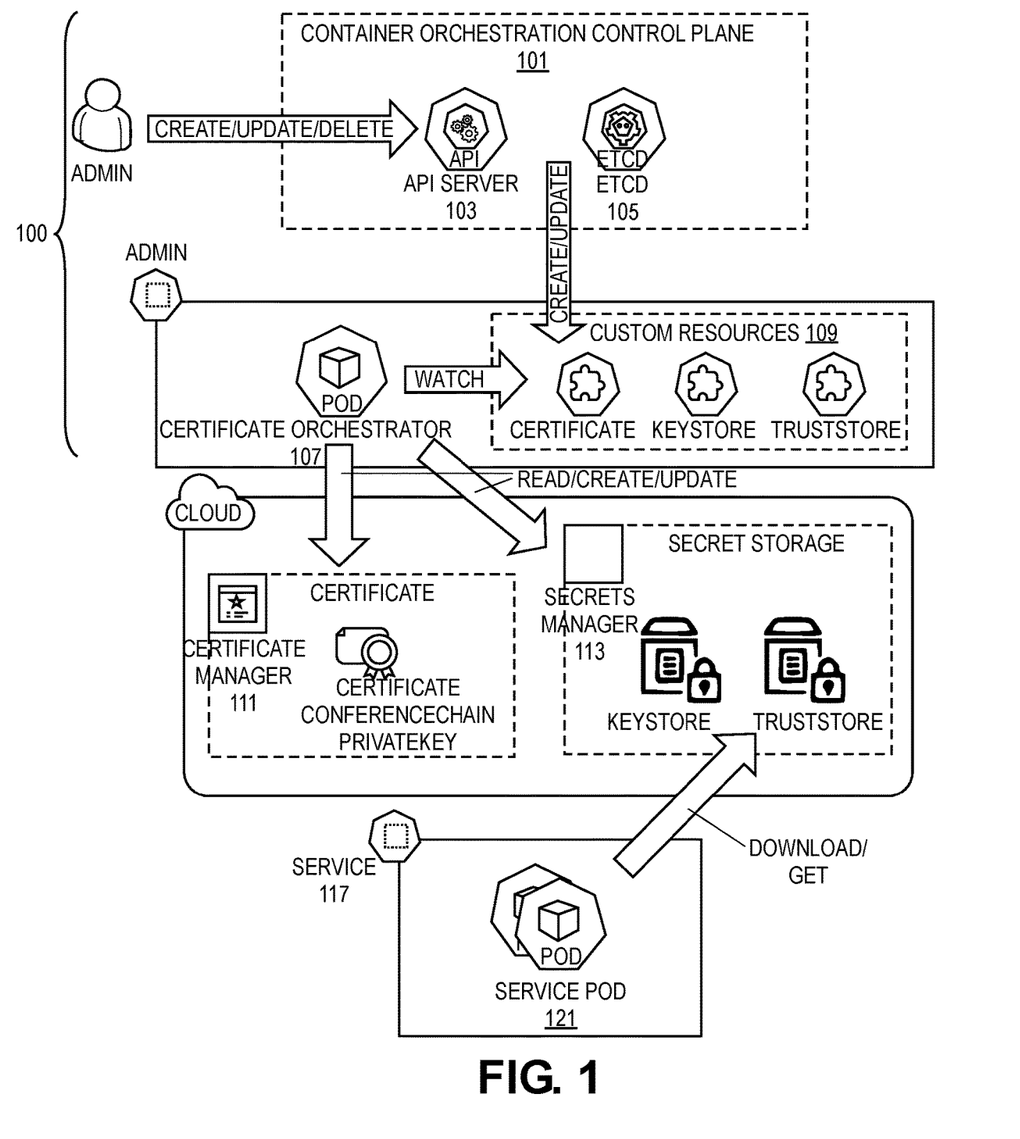
FIG. 1 is a diagram of one example implementation of a cloud computing environment including a container orchestrator with a certificate orchestrator.

FIG. 1 is a diagram of one example implementation of a container orchestration system including the certificate orchestrator. Containers are similar to virtual machines, but have relaxed isolation properties. Containers share the Operating System (OS) among the applications that are executed within the containers. Containers are considered lightweight, because they do not include a separate operating system. Each container has its own filesystem. Also, each container has a separate share of computing resources, such as processors, memory, process space, and similar resources. Containers are decoupled from the underlying computing infrastructure, which makes containers portable in distributed processing environments such as cloud computing environments.

Containers are instantiated and managed by container orchestration systems 100. In the container orchestration system 100, containers are utilized to execute applications. The container orchestration system 100 manages the containers that run the applications and ensure that there is no downtime. If a container fails, then the container orchestration system 100 instantiates another container. Examples of container orchestration systems include Kubernetes, which is utilized by way of example herein and not limitation. The container orchestrations system 100 handles scaling and failover for containers and applications. A container orchestration system 100 such as Kubernetes can also handle service discovery and load balancing where the container orchestration system 100 can expose a container using the domain name service (INS) name or using an Internet Protocol (PP) address.

Container orchestration systems 100 also manage storage orchestration, rollouts and rollbacks of container state, resource Management, container configuration, secret management, and similar functions. A container orchestration system 100 can be composed of a set of workers, referred to as nodes, which run containerized applications. Groups of nodes managed by the container orchestration system 100 can be referred to as a cluster. The nodes can host 'pods' that are the components of the application workload. The container orchestration system 100 includes a control plane 101 that manages the nodes and the pods in the cluster. The control plane 101 usually runs across multiple computing devices and a cluster usually runs multiple nodes, providing fault-tolerance and high availability.

The control plane 101 of the container orchestration system 100 includes a set of components that make decisions about the operation of cluster (e.g., resource allocation, scheduling, and similar functions), and responding to cluster events. Control plane 101 components can execute on any computing device association with the cluster. The container orchestration system 100 runs applications by placing applications in containers, which are placed into pods to run on nodes. A node may be a virtual or physical machine, depending on the cluster. Each node contains the functions necessary to run pods, managed by the control plane. The control plane 101 can include an application programming interface (API) server 103, and etcd 105, amongst other components. The API server 103 can provide an interface for programs and administrators to communicate with the control plane 101. The etcd is a distributed key-value store that can be utilized by the container orchestration system 100.

In a Kubernetes implementation, pods are the smallest deployable units of computing that can be generated and managed. A pod is a group of one or more containers, with shared storage and network resources, and a specification for how to run the containers. The certificate orchestrator 107 operates as a controller, part of the control plane 100, or with similar properties. In a Kubernetes implementation, the certificate orchestrator 107 is implemented as a Kubernetes Controller. In Kubernetes, controllers are control loops that watch the state of the cluster, then make or request changes where needed. Each controller tries to move the current cluster state closer to a desired state. A Kubernetes controller tracks at least one Kubernetes resource type. These objects have a spec field that represents the desired state. The Kubernetes controller(s) for that resource are responsible for making the current state come closer to that desired state. The Kubernetes API can be extended to create an application-specific controller to create, configure and manage instances of complex stateful applications on behalf of a Kubernetes user. The custom Kubernetes controller builds upon Kubernetes resource and controller concepts and includes domain or application-specific knowledge to automate common tasks better managed by computers. The certificate orchestrator 107 can be implemented as such a custom Kubernetes controller.

The certificate orchestrator 107 can be configured so monitor custom resource definition (CRD) 109. A resource is an endpoint in the Kubernetes API that stores a collection of API objects of a certain kind. A custom resource is an extension of the Kubernetes API that is not available in a default Kubernetes installation. It represents a customization of a particular Kubernetes installation. Custom resources can appear and disappear in a running cluster through dynamic registration, and cluster administrators can update custom resources independently of the cluster itself. Once a custom resource is installed, users can create and access its objects, just as they do for built-in resources like Pods. The certificate orchestra car 107 can be an implementation of an extension to Kubernetes API to satisfy an application specific use-case for managing the certificate lifecycle.

The certificate orchestrator 107 is a custom (e.g., Kubernetes) controller which monitors custom resources 109 of kind certificates, keystores and truststores for the create, delete, and update events and takes a defined action based on those events. The certificate orchestrator interacts with a cloud certificate manager 111 for requesting and downloading certificates to create secret storage custom resources 109, such as key stores and trust stores. After creating key stores and trust stores as custom resources, the certificate orchestrator 107 initiates a session with the secrets manager 113 to upload the key stores and trust stores to the secret storage of the cloud computing environment.

As illustrated in FIG. 1, the certificate orchestrator 101 monitors the custom resources 109 (i.e., certificates, keystores and truststores) for associated create and update events. When a create event for certificate occurs, the certificate orchestrator 107 captures the create event and requests a new certificate from the cloud certificate manager 111. When the create event for the keystore occurs, then the certificate orchestrator 107 downloads the service's certificate bundle from the cloud certificate manager, creates a keystore and uploads it to cloud secrets manager 113. When the create event for trust store occurs, then the certificate orchestrator 101 downloads the service's certificate bundle along with upstream and downstream service's certificates from the cloud certificate manager 111. The certificate orchestrator 101 then builds a truststore as part of the custom resources 109 which includes the service certificate chain along with upstream and downstream service certificates and uploads the truststore to cloud secrets manager 113.

Certificate orchestrators 107 can execute in an administrative or control plane space within the container orchestration system. Since the certificate orchestrator 107 handles sensitive data including certificates, keystores and truststores for services, it is important that the certificate orchestrator 107 is secure. The certificate orchestrator 107 can be deployed in its own namespace where the namespace resources can be accessed only by cluster administrators. The certificate orchestrator 107 needs access to CRD objects 109 of certificates, keystore and truststore which can be deployed in any service specific namespace. Since the certificate orchestrator 107 needs to watch all namespaces it can be provided high level access privileges such as ClusterRole privileges in Kubernetes. The certificate orchestrator also needs access to the cloud certificate manager 11 for requesting new certificates and the cloud secrets manager 113 for uploading keystores and truststores. In a Kubernetes implementation, this access to the certificate orchestrator 107 is provided using identity and access management (IAM) roles.

The certificate CRD in the custom resources 109 is a custom resource that defines the metadata required to request a certificate from the cloud certificate manager 111. The metadata of the certificate CRD includes the certificate of the fully qualified domain name (FQDN) and type of certificate. The keystore CRD is a custom resource 109 that defines the keystore resource. The resource specification accepts metadata for generating new keystores for a particular service. The certificate orchestrator 107 uploads the metadata to the cloud secrets manager 113. The truststore CRD is a custom resource that defines the truststore resource. The resource specification accepts service metadata along with the upstream and downstream services. The certificate orchestrator 107 creates the keystore and truststore and uploads them to the cloud secrets manager 113. In some implementations, the certificate orchestrator 107 can handle protection of services in the case of a breach in an upstream or downstream service. In response to detecting the breach, the certificate orchestrator 107 can update the CRD resources to generate new keystores and truststores with new certificates and restart the associated service pods. In some implementations, the certificate orchestrator 107 can remove the names of services that are compromised from the metadata of the truststore CRD of the upstream or downstream services.

The service 117 is a set of functions implemented in a set of containers that can be a part of a larger application with additional functions also implemented in a related set of containers. The service 117 can be assigned to a specific node or distributed over multiple nodes depending on the implementation. The service 117 functions can be implemented as a set of pods, e.g., where the container orchestration system is Kubernetes. The service 117 or specific service pod 121 can be provided the location information for the secret storage in the cloud computing environment where the certificate information (e.g., public/private keys, certificate chain, and similar information) is stored. The administrator, certificate orchestrator 107, or similar component of the control plane 101 can provide the location information to the service 117.

Figure 2:
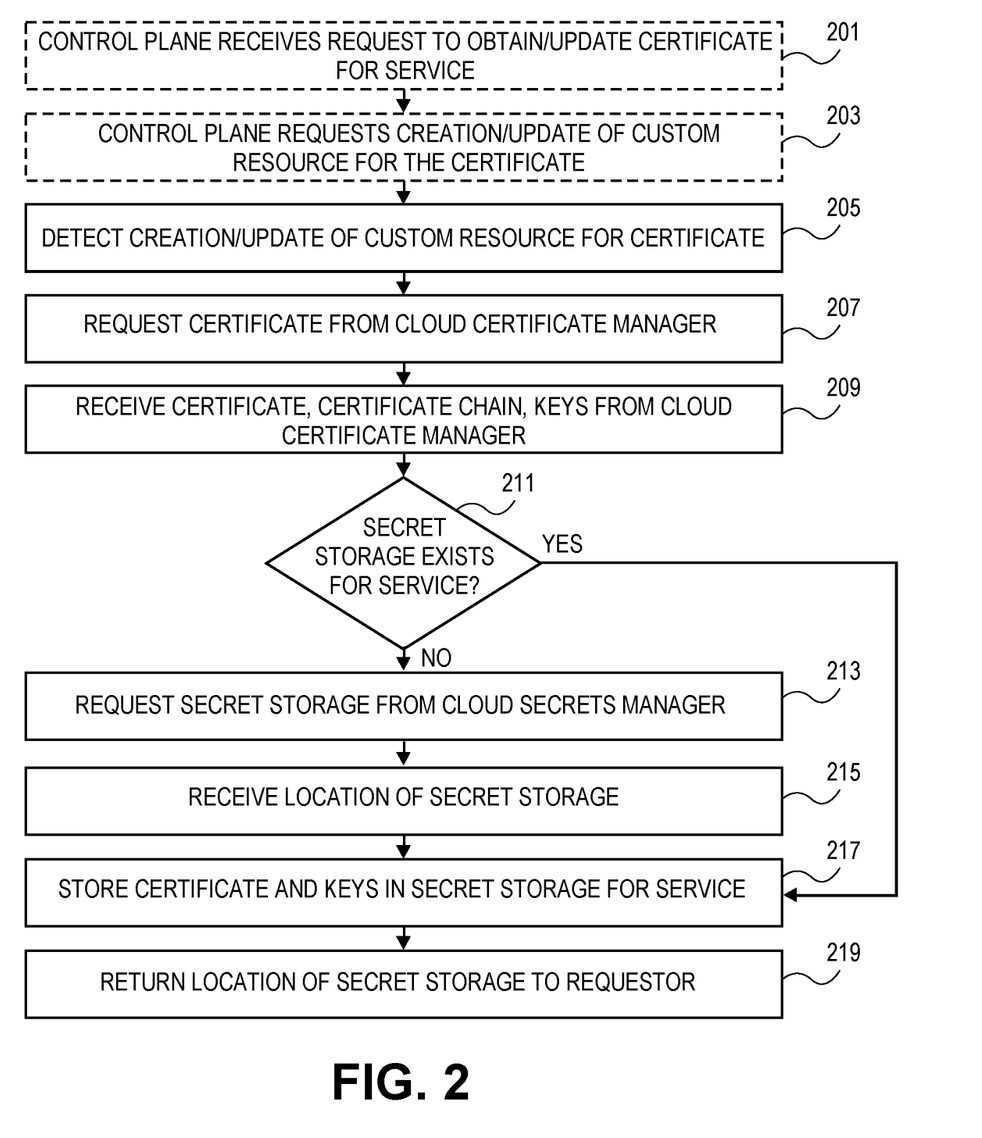
FIG. 2 is a flowchart of one example implementation of a process of the certificate orchestrator for creating or updating certificates for services.

FIG. 2 is a flowchart of one example implementation of the process of the certificate orchestrator to create or update a certificate. In one example, an application, includes several services, including a test-service, which talks to a proxy service and database service. To have encrypted service-to-service communication for this application, certificates are needed for each service along with associated keystores and/or truststores. The certificate orchestrator has access to or creates keystores and truststores for each service using an underlying secrets manager in the cloud computing environment.

In the example, to create certificates for the three services the certificate orchestrator or similar component can create certificate objects for all three services. This process can be triggered by a request received from an administrator, the service, associated application or similar source in the control plane to create the certificates (Block 201). The process operates similarly for updates such as renewals of certificates and the processes are described together in reference to FIG. 2. In response, the control plane requests the creation or update of the custom resources that represent the respective certificates for each of the services (Block 203). The certificate orchestrator monitors the custom resources related to certificates, keystores, and truststores and detects the creation or update of these custom resources (Block 205).

In response to detecting the creation or update of the custom resources, the certificate orchestrator requests a certificate for renewal from the cloud certificate manager of the cloud computing environment (Block 207). In response, a certificate and associated information such as the public and private keys and chain of the certificate are returned to the certificate orchestrator (Block 209).

The custom resources and associated objects are updated by the certificate orchestrator with information related to the certificate. A check can then be made to determine whether a secret store has been established for each service (Block 211). If a secret store already exists for the service, then the certificate and/or the public/private keys can be stored in the secret store within the cloud computing environment (Block 217). The secret store can include keystores and/or truststores, where separate keystores and/or truststores are established for each service, or separate locations (e.g., entries) are utilized in a larger structure for each service. Information relating to the services utilizing the certificates and keys can be stored in the secret storage as well as the associated custom resources for the certificates. Similarly, the chain of authentication of the certificate can be stored in the secrete store. Access to and storage into the secret storage can be by way of the secrets manager of the cloud computing environment.

If a secret storage has not been established for the service, then the certificate orchestrator can request the establish a secret storage location for the service (Block 213). In response, the cloud secrets manager establishes the secret storage for the service and returns the location of the secret storage for the service to the container orchestrator (Block 215). The container orchestrator can then store the certificate and/or the public/private keys in the secret store within the cloud computing environment (Block 217). The secret store can include keystores and/or truststores, where separate keystores and/or truststores are established for each service, or separate locations (e.g., entries) are utilized in a larger structure for each service. Information relating to the services utilizing the certificates and keys can be stored in the secret storage as well as the associated custom resources for the certificates. Similarly, the chain of authentication of the certificate can be stored in the secret store. Access to and storage into the secret storage can be by way of the secrets manager of the cloud computing environment.

Figure 3:
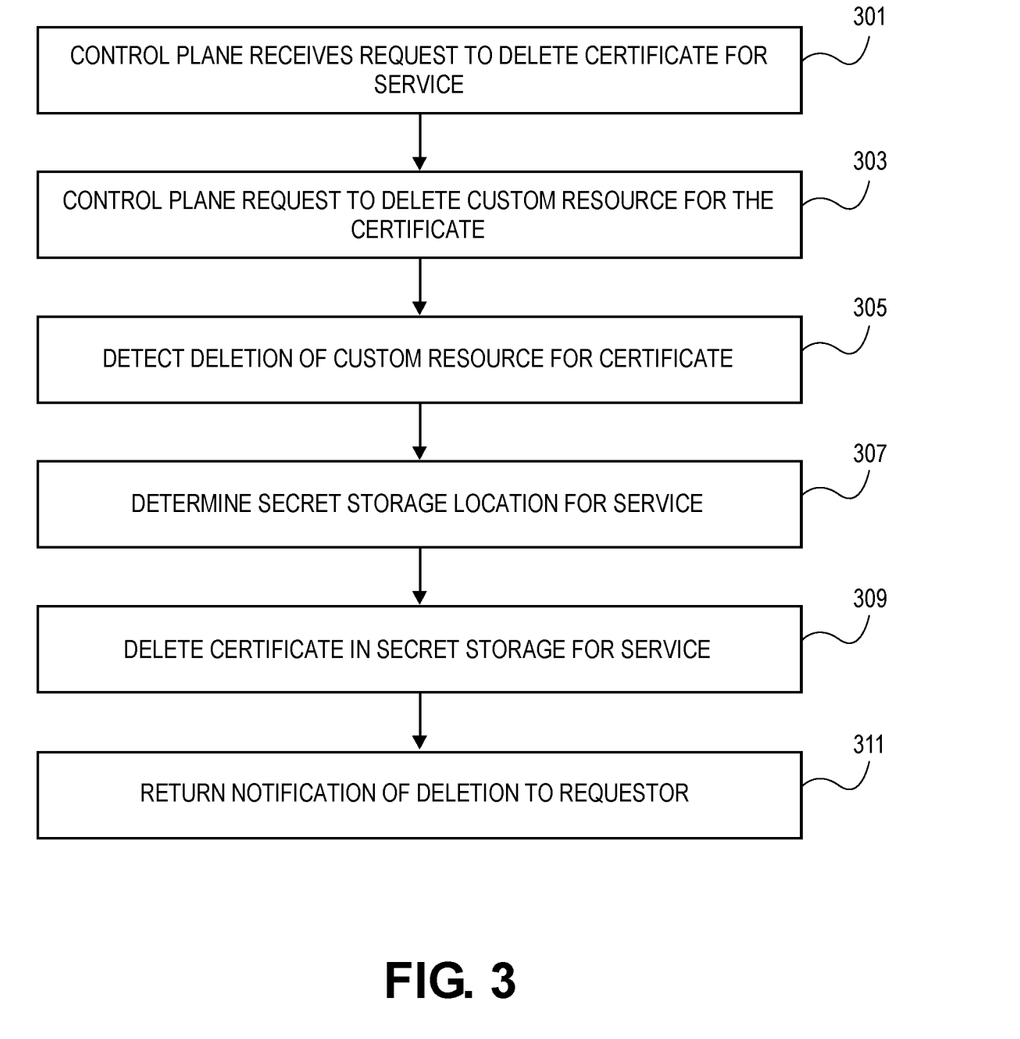
FIG. 3 is a flowchart of one example implementation of a process of the certificate orchestrator for deleting certificates for services.

FIG. 3 is a flowchart of one example implementation of the process of the certificate orchestrator to delete a certificate. In one example, an application includes several services, including a test-service, which talks to a proxy service and database service. The test service completes and no longer needs to utilize the proxy service, such that the certificate can be deleted. The certificate orchestrator can manage the removal of certificate information in keystores and truststores for each service using an underlying secrets manager in the cloud computing environment.

In the example, to delete a certificate the certificate orchestrator or similar component can delete or modify a certificate object for the affected services. This process can be triggered by a request received from an administrator, the service, associated application or similar source in the control plane to delete the certificates (Block 301). In response, the control plane requests the deletion of the custom resources that represent the respective certificates for each of the services (Block 303). The certificate orchestrator monitors the custom resources related to certificates, keystores, and truststores and detects the deletion or similar modification of these custom resources (Block 305).

In response to detecting the creation or update of the custom resources, the certificate orchestrator determines a location of the certificates or related information using information from the monitored custom resource or similar sources (Block 307). The certificate orchestrator can then request that the secret storage manager of the cloud computing environment delete the certificate information from the identified secret storage location, e.g., deleting information from the associated keystores or truststores (Block 309). The cloud secrets manager deletes the certificates or associated information and notifies the certificate orchestrator. In turn, the certificate orchestrator notifies the requester of the deletion of the certificate that the process has completed and the information has been removed from the secret storage (Block 311). In some cases, the secret storage for the services is also removed.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 4A:
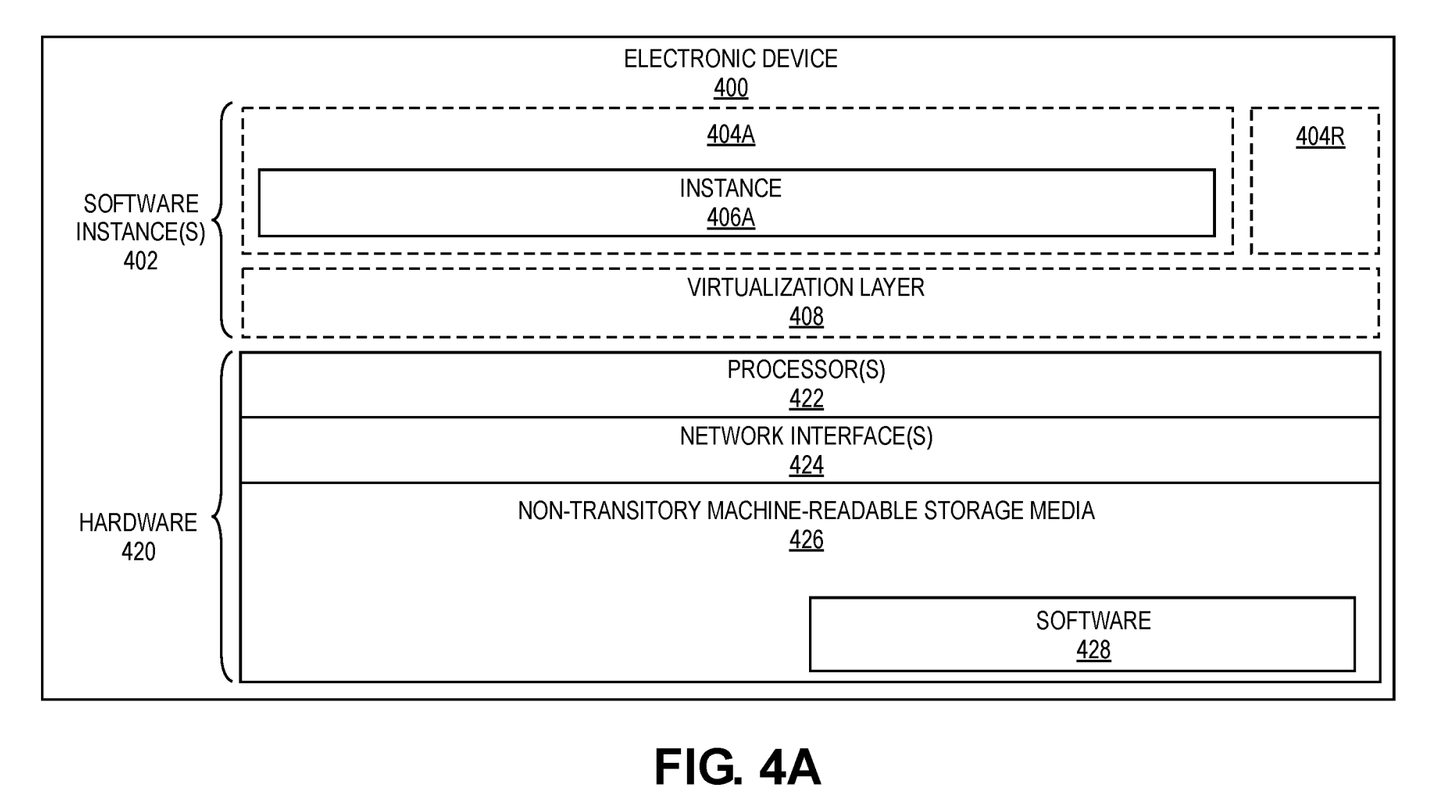
FIG. 4A is a block diagram illustrating an electronic device according to some example implementations.

FIG. 4A is a block diagram illustrating an electronic device 400 according to some example implementations.

FIG. 4A includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). Each of the previously described end user clients and the certificate orchestration service may be implemented in one or more electronic devices 400. In one implementation: 1) each of the end user clients is implemented in a separate one of the electronic devices 400 (e.g., in user electronic devices operated by users where the software 428 represents the software to implement end user clients to interface with the certificate orchestration service (e.g., a web browser, a native client, a portal, a command-line interface, and/or an application program interface (API) based upon protocols such as Simple Object Access Protocol (SOAP), Representational State Transfer (REST), etc.)); 2) the certificate orchestration service is implemented in a separate set of one or more of the electronic devices 400 (e.g., a set of one or more server electronic devices where the software 428 represents the software to implement the certificate orchestration service); and 3) in operation, the electronic devices implementing the end user clients and the certificate orchestration service would be communicatively coupled (e.g., by a network) and would establish between them (or through one or more other layers) connections for submitting request to the certificate orchestration service and returning the location of the secret storage to the end user clients. Other configurations of electronic devices may be used in other implementations (e.g., an implementation in which the end user client and the certificate orchestration service are implemented on a single electronic device 400).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 4B:
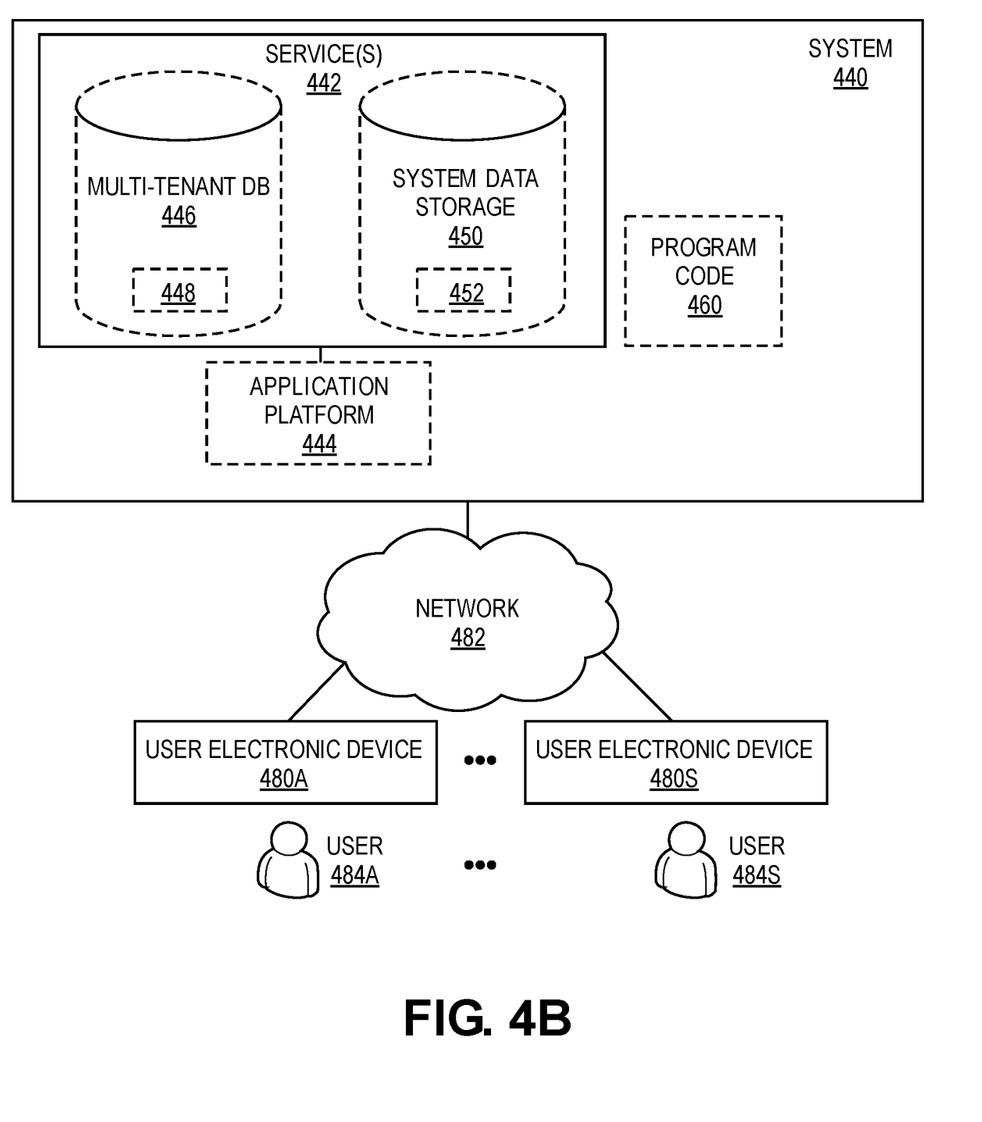
FIG. 4B is a block diagram of an environment where a container orchestration system including a certificate orchestrator may be deployed, according to some implementations.

FIG. 4B is a block diagram of an environment where a certificate orchestrator may be deployed, according to some implementations. A system 440 includes hardware (a set of one or more electronic devices) and software to provide service(s) 442, including the certificate orchestration service. The system 440 is coupled to user electronic devices 480A-S over a network 482. The service(s) 442 may be on-demand services that are made available to one or more of the users 484A-S working for one or more other organizations (sometimes referred to as outside users) so that those organizations do not need to necessarily be concerned with building and/or maintaining a system, but instead makes use of the service(s) 442 when needed (e.g., on the demand of the users 484A-S). The service(s) 442 may communication with each other and/or with one or more of the user electronic devices 480A-S via one or more Application Programming Interface(s) (APIs) (e.g., a Representational State Transfer (REST) API). The user electronic devices 480A-S are operated by users 484A-S.

In one implementation, the system 440 is a multi-tenant cloud computing architecture supporting multiple services, such as a container orchestration system including a certificate orchestrator, a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 440 may include an application platform 444 that enables PAAS for creating, managing, and executing one or more applications developed by the provider of the application platform 444, users accessing the system 440 via one or more of user electronic devices 480A-S, or third-party application developers accessing the system 440 via one or more of user electronic devices 480A-S.

In some implementations, one or more of the service(s) 442 may utilize one or more multi-tenant databases 446 for tenant data 448, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user electronic device 480A-S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the one or more multi-tenant database 446 and/or system data storage 450.

In some implementations, the service(s) 442 are implemented using virtual applications dynamically created at run time responsive to queries from the user electronic devices 480A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the container orchestration system including the certificate orchestration service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 440 and the user electronic devices 480A-S.

Each user electronic device 480A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 440. For example, the user interface device can be used to access data and applications hosted by system 440, and to perform searches on stored data, and otherwise allow a user 484 to interact with various GUI pages that may be presented to a user 484. User electronic devices 480A-S might communicate with system 440 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 480A-S might include an HTTP client, commonly referred to as a "browser," for sending and receiving HTTP messages to and from server(s) of system 440, thus allowing users 484 of the user electronic device 480A-S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for certificate management for services in a container orchestration system, the method comprising:
responsive to detecting a request for a certificate-related resource from one of the services implemented in a set of containers in the container orchestration system, the certificate-related resource associated with at least one of a certificate, keystore and truststore, a controller of the container orchestration system performing the following:
requesting the certificate-related resource from a cloud certificate manager for the one of the services;
receiving the certificate-related resource from the cloud certificate manager;
storing the certificate-related resource in a secret storage; and
returning a location of the secret storage for provision to the one of the services.

2. The method of claim 1, further comprising:
monitoring a custom resource definition to detect the request for the certificate-related resource.

3. The method of claim 1, further comprising:
requesting the secret storage be established by a cloud secrets manager, in response to determining that the secret storage is unavailable for the one of the services.

4. The method of claim 1, further comprising:
receiving a private key from the cloud certificate manager; and
storing the private key in the secret storage.

5. The method of claim 1, wherein the secret storage includes at least one of a key store and a trust store.

6. The method of claim 1, wherein the location of the secret storage is a pointer to a location in a cloud computing environment.

7. The method of claim 1, wherein the container orchestration system is Kubernetes, and wherein the one of the services is a pod.

8. The method of claim 1, further comprising:
requesting to delete a certificate associated with a certificate-related resource for the one of the services from a cloud secrets manager, in response to detecting a request from a control plane of the container orchestration system to delete the certificate for the one of the services;
receiving confirmation of deletion of the certificate from the cloud secrets manager; and
returning the confirmation of the deletion to a requester of the deletion of the certificate.

9. A non-transitory machine-readable storage medium that provides instructions that, if executed by a processor, will cause said processor to perform operations of a method for certificate management for services in a container orchestration system, the operations comprising:
responsive to detecting a request for a certificate-related resource from one of the services implemented in a set of containers in the container orchestration system, the certificate-related resource associated with at least one of a certificate, keystore and truststore, a controller of the container orchestration system performing the following:
requesting the certificate-related resource from a cloud certificate manager for the one of the services;
receiving the certificate-related resource from the cloud certificate manager;
storing the certificate-related resource in a secret storage; and
returning a location of the secret storage for provision to the one of the services.

10. The non-transitory machine-readable storage medium of claim 9, having further instructions for operations further comprising:
monitoring a custom resource definition to detect the request for the certificate-related resource.

11. The non-transitory machine-readable storage medium of claim 9, having further instructions for operations further comprising:
requesting the secret storage be established by a cloud secrets manager, in response to determining that the secret storage is unavailable for the one of the services.

12. The non-transitory machine-readable storage medium of claim 9, having further instructions for operations further comprising:
receiving a private key from the cloud certificate manager; and
storing the private key in the secret storage.

13. The non-transitory machine-readable storage medium of claim 9, wherein the secret storage includes at least one of a key store and a trust store.

14. The non-transitory machine-readable storage medium of claim 9, wherein the location of the secret storage is a pointer to a location in a cloud computing environment.

15. The non-transitory machine-readable storage medium of claim 9, wherein the container orchestration system is Kubernetes, and wherein the one of the services is a pod.

16. The non-transitory machine-readable storage medium of claim 9, having further instruction for operations further comprising:
requesting to delete a certificate associated with a certificate-related resource from a cloud secrets manager, in response to detecting a request from a control plane of the container orchestration system to delete the certificate for the one of the services;
receiving confirmation of deletion of the certificate from the cloud secrets manager; and
returning the confirmation of the deletion to a requester of the deletion of the certificate.

17. A computing system comprising:
a non-transitory machine-readable medium having stored therein a certificate orchestrator; and
a processor, coupled to the non-transitory machine-readable medium, to execute the certificate orchestrator to perform certificate management for services in a container orchestration system, the certificate orchestrator configurable to cause the processer to:
responsive to detecting a request for a certificate-related resource from one of the services implemented in a set of containers in the container orchestration system, the certificate-related resource associated with at least one of a certificate, keystore and truststore, a controller of the container orchestration system performing the following:
request the certificate-related resource from a cloud certificate manager for the one of the services,
receive the certificate-related resource from the cloud certificate manager,
store the certificate-related resource in a secret storage, and
return a location of the secret storage for provision to the one of the services.

18. The computing system of claim 17, wherein the certificate orchestrator is further configurable to monitor a custom resource definition to detect the request for the certificate-related resource.

19. The computing system of claim 17, wherein the certificate orchestrator is further configurable to request the secret storage be established by a cloud secrets manager, in response to determining that the secret storage is unavailable for the one of the services.

20. The computing system of claim 17, wherein the certificate orchestrator is further configurable to receive a private key from the cloud certificate manager, and store the private key in the secret storage.

21. The computing system of claim 17, wherein the secret storage includes at least one of a key store and a trust store.

22. The computing system of claim 17, wherein the location of the secret storage is a pointer to a location in a cloud computing environment.

23. The computing system of claim 17, wherein the container orchestration system is Kubernetes, and wherein the one of the services is a pod in Kubernetes.

24. The computing system of claim 17, wherein the certificate orchestrator is further configurable to:
request to delete a certificate associated with a certificate-related resource from a cloud secrets manager, in response to detecting a request from a control plane of the container orchestration system to delete the certificate for the one of the services,
receive confirmation of deletion of the certificate from the cloud secrets manager, and
return the confirmation of the deletion to a requester of the deletion of the certificate.

* * * * *